United States Patent [19]
Griswold

[11] 3,769,602
[45] Oct. 30, 1973

[54] ANALOG PHASE TRACKER
[75] Inventor: Frederick Bethel Griswold, Roosevelt, N.J.
[73] Assignee: RCA Corporation, New York, N.Y.
[22] Filed: Aug. 7, 1972
[21] Appl. No.: 278,289

[52] U.S. Cl. ............... 329/122, 325/346, 325/419, 328/134, 329/50, 331/18, 331/25, 244/1 SA, 343/117 A
[51] Int. Cl. ........................................... H03d 3/24
[58] Field of Search ................. 329/50, 122; 331/8, 331/23, 25; 328/133, 134; 325/346, 419

[56] References Cited
UNITED STATES PATENTS

| | | | |
|---|---|---|---|
| 3,130,376 | 4/1964 | Ross | 329/50 X |
| 3,217,267 | 11/1965 | Loposer | 331/18 X |
| 3,408,591 | 10/1968 | Helgesson | 331/25 X |
| 3,551,826 | 12/1970 | Sepe | 331/25 UX |
| 3,588,730 | 6/1971 | Schreuer | 331/25 X |
| 3,706,092 | 12/1972 | Cox Jr. et al. | 328/133 X |

*Primary Examiner*—Alfred L. Brody
*Attorney*—Edward J. Norton et al.

[57] ABSTRACT

An analog phase tracker includes a phase tracking loop comprising a phase detector, a voltage controlled oscillator, a plurality of dividers and at least one multiplier for altering the phase of the voltage controlled oscillator output solely by dividing the oscillator output phase by the product of all of the dividers, while altering the frequency of the voltage controlled oscillator output by both dividing the frequency by the product of the divisors and multiplying the frequency by an integer equal to at least one of the divisors such that the frequency and phase of a signal derived by the dividers and multipliers is substantially the same as an applied periodic signal whose repetition rate may be any one of plurality of predetermined values.

10 Claims, 4 Drawing Figures

| | | 1 | | 2 | | 3 | | 4 | |
|---|---|---|---|---|---|---|---|---|---|
| $N_1$ | | 1 | | 2 | | 3 | | 6 | |
| $N_2$ | | 6 | | 3 | | 2 | | 1 | |
| a | $\frac{F_i}{N_2} \angle \theta$ | 9° | 200 | 9° | 400 | 9° | 600 | 9° | 1200 |
| c | $F_d \angle N_1 N_2 \theta$ | 54° | 1200 | 54° | 1200 | 54° | 1200 | 54° | 1200 |
| d | $\phi F_d \div N_1$ $\frac{F}{N_1} \angle N_2 \theta$ | 54° | 1200 | 27° | 600 | 18° | 400 | 9° | 200 |
| e | $F_d \times N_1$ $F_d \angle N_2 \theta$ | 54° | 1200 | 27° | 1200 | 18° | 1200 | 9° | 1200 |
| f | $\phi F_d \div N_2$ $\frac{F_d}{N_2} \angle \theta$ | 9° | 200 | 9° | 400 | 9° | 600 | 9° | 1200 |
| | | $\theta$ | f Hz | $\theta$ | f Hz | $\theta$ | f Hz | $\theta$ | f Hz |

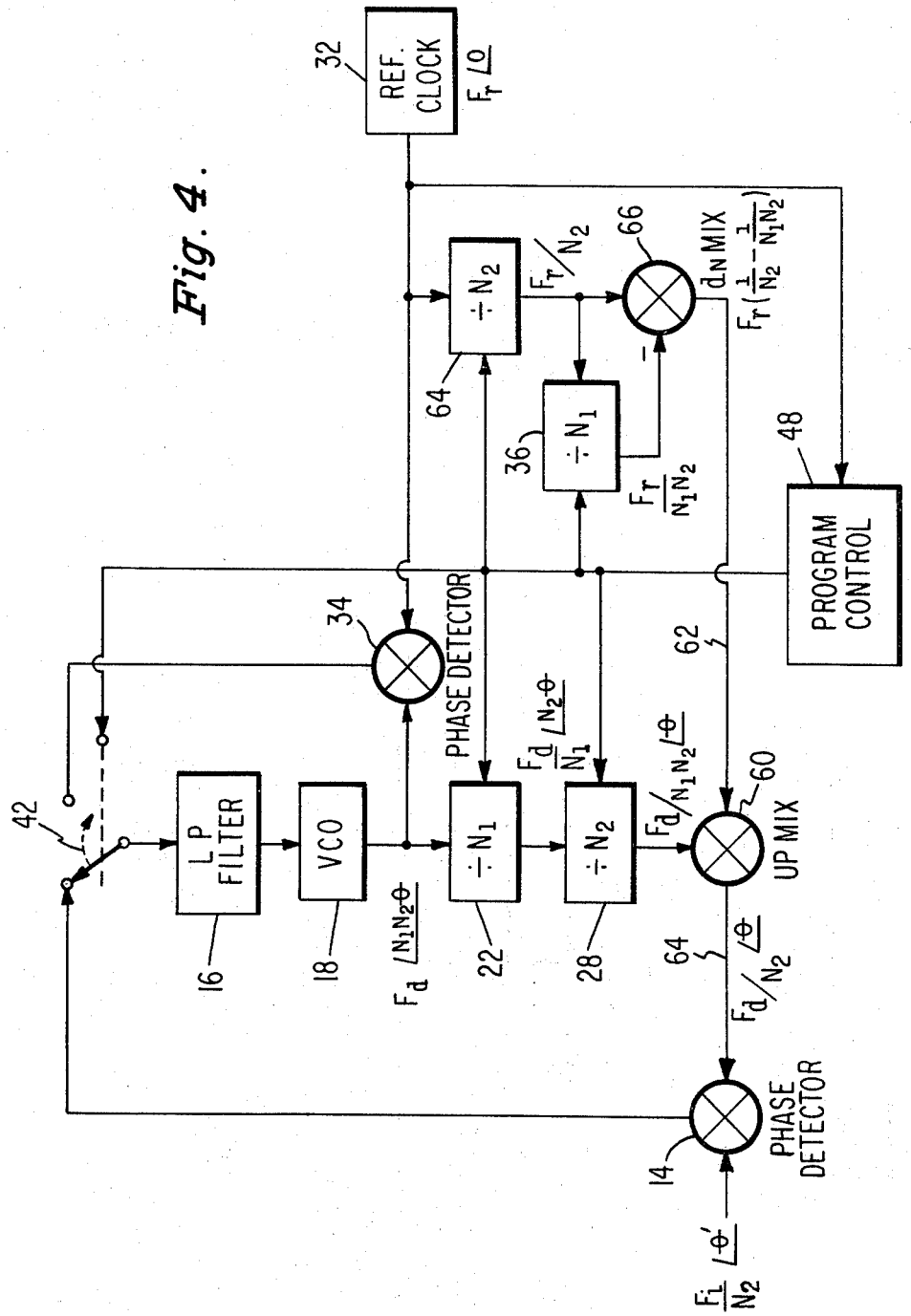

ANALOG PHASE TRACKER

The invention herein described was made in

The present invention relates to phase tracking apparatus.

Presently there is increasing use of earth orbiting satellites for communication and navigation. With respect to navigational aids, one such use includes a system utilizing periodic bursts of range tones emitted by an earth orbiting satellite for enabling a moving receiving station receiving the range tones to measure the phase difference between the received range tones and an atomic reference standard for precisely defining the location of the station. Such a system is described in co-pending application entitled Rate Aided Ranging and Time Dissemination Receiver invented by Buntschuh et al., Ser. No. 208,762, filed Dec. 16, 1971, and assigned to the assignee of the present invention. The range tones include periodic signals whose frequency occurs in steps from 100 Hertz to 10 megaHertz. To achieve accuracy within one per cent of the period of the highest frequency so that a moving object may be precisely located, conventional phase lock loops have proved unsatisfactory due to phase jitter and wide loop bandwidth.

It is desired that the phase lock loop maintain phase coherency without phase jitter and drift while the periodic input signal shifts in frequency in orders of magnitude. Conventional phase lock loops include a voltage controlled oscillator (hereinafter called VCO) whose output is harmonically related to the periodic input signal at some multiple thereof. A dividing network is provided in the loop to divide down the VCO output to derive the desired frequencies. However, it is known that loop bandwidth and phase jitter will vary in accordance with the amount of division and number of different frequencies derived. Therefore, the loop transfer function will vary when multiple divisions occur in the loop. These conditions are unsatisfactory to maintain phase coherency for a signal having the frequencies noted above. Additionally, where high frequencies are processed, conventional phase lock loops will not operate with inexpensive microelectric integrated circuits.

SUMMARY OF THE INVENTION

In accordance with the present invention, a phase tracking loop is provided for tracking the phase of a periodic input signal whose repetition rate may be any one of a plurality of predetermined values, the phase tracking loop having a given bandwidth which is substantially invarient with all of these values. The loop comprises a voltage controlled oscillator for generating an output signal having a given frequency which is harmonically related to each and every one of the values. A phase detector is provided for producing an error signal manifesting the difference in phase between a first signal input and a second signal input thereto. Input means are provided for applying the periodic input signal as a first signal input to the phase detector and the error signal as an input to the voltage controlled oscillator.

Programmed signal deriving means are coupled between the voltage controlled oscillator and the phase detector for deriving the second signal input to the phase detector from the output of the voltage controlled oscillator. The signal deriving means includes a plurality of integral dividers and at least one multiplier for altering the phase of the voltage controlled oscillator output solely by dividing the output phase by the product of all the divisors of the dividers while altering the freuqency of th voltage controlled by oscillator output by both dividing the frequency by the product of the divisors and multiplying the frequency by an integer equal to at least one of the divisors such that the frequency and phase of a derived signal is substantially the same as the periodic signal then being applied to the phase tracking loop.

IN THE DRAWINGS

FIG. 1 is a block diagram illustrating the phase tracking loop arranged in accordance with the present invention, FIG. 2 is a plot of various waveforms at selected points in the embodiment of FIG. 1 useful in explaining the principles of the present invention, FIG. 3 is a table of illustrative values to be used in conjunction with FIG. 2, and FIG. 4 is a block diagram of an alternate embodiment of a tracking loop arranged in accordance with the present invention.

DETAILED DESCRIPTION

Figure 1:
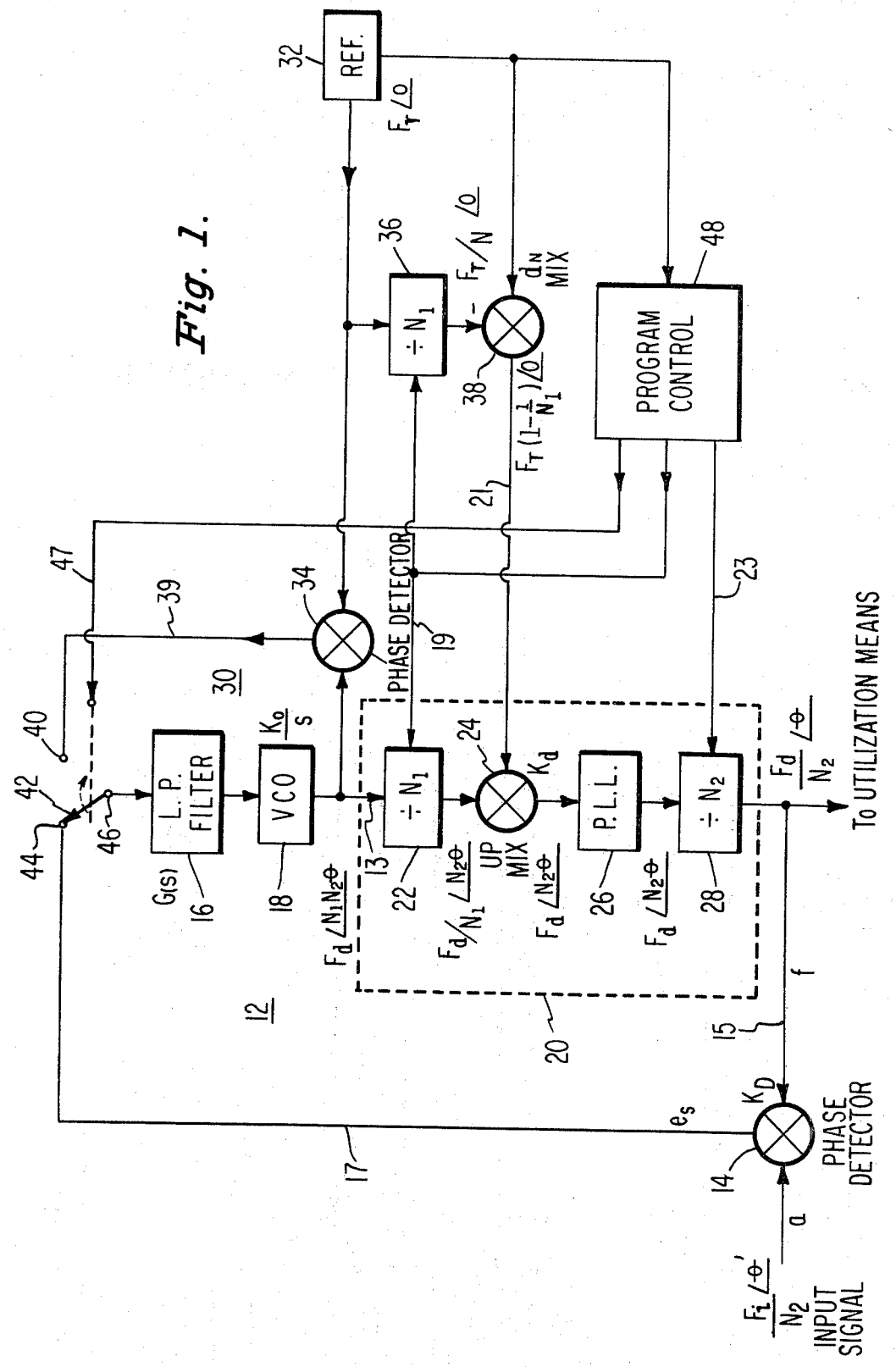

In FIG. 1 there is shown an embodiment of the invention for phase tracking a periodic input signal $F_i/N_2$ having a repetition rate $f_i/N_2$ at a phase angle $\theta'$. $N_2$ is any integral value relating each range tone to the highest frequency range tone when $N_2=1$, while $\theta'$ represents the phase error between the input signal $F_i/N_2$ $\lfloor \theta'$ and a reference clock signal $F_{ref}$ $\lfloor 0$ having a phase angle of zero. The angle $\theta'$ equals $\omega_i \tau$ where $\tau$ is the propagation delay between the transmitter of $F_i$ and the receiver, a portion of which is described herein. THe angle $\theta'$ is denoted differently from $\theta$ to indicate the dynamic tracking error due to relative motion between transmitter and receiver resulting in a non-zero error signal $e_s$. The designation F designates a signal having a frequency $f$ which is the same regardless of the subscript. $F_i/N_2$ $\lfloor \theta'$ is a signal having M different repetition rates which are $N_2$ harmonics of $F_i$. These harmonics are sequentially applied as an imput signal to the phase tracking loop 12 constructed in accordance with the present invention.

Loop 12 generates a signal $F_d/N_2$ $\lfloor \theta'$ which precisely tracks input signal $F_i/N$ $\lfloor \theta'$ which may have M different frequencies. It is imperative that loop 12 does not drift and maintains phase coherency while locking on to each of the M different input frequencies. In a satellite range tone navigational system the M frequencies of signal $F_i/N_2$ $\lfloor \theta$ may vary between, for example, 100 Hertz to 10 megaHertz in ten fold increments and may be used to precisely identify the location of the moving receiving station. Conversely, if the location of the receiver is known precisely, then this system may be used to determine the accuracy of the reference frequency. The phase of each frequency of signal $F_i/N_2$ $\lfloor \theta'$ must be related to the same reference phase angle since the different frequencies are employed to resolve phase ambiguities related to ranging information, in other words, they all have a common zero crossing. Any drift in phase of the generated signal $F_d/N_2$ $\lfloor \theta$ from the input signal will detract from the operation of the system.

The input signal $F_i/N_2$ $\lfloor \theta'$ tends to be weak and noisy and any attempt to measure phase difference directly between this input signal and a reference clock would be futile. Consequently, the phase tracking loop constructed in accordance with the present invention is provided to derive a signal whose phase and frequency tracks the input signal with phase coherency and high signal to noise ratio for subsequent use by means (not shown) for measuring the phase difference between the derived signal $F_d/N_2$ $\underline{/\theta}$ and the reference clock signal $F_r$ $\underline{/0}$ having a zero reference phase angle. Preferably, such phase measuring means may be as described in my copending application entitled Phase Measuring System, Ser. No. 278,266 filed Aug. 7, 1972 and assigned to the assignee of the present invention.

Loop 12 comprises a phase detector 14, a low pass filter 16, a voltage controlled oscillator 18 and programmed signal deriving means 20 which derives signal $F_d/N_2$ $\underline{/\theta}$ whose phase and frequency tracks input signal $F_i/N_2$ $\underline{/\theta'}$ regardless of the value of $N_2$ at any given instant. Signal deriving means 20 includes a divide by $N_1$ divider 22, an up mixer 24, a phase lock loop 26 serving to filter the signal applied thereto so that signal $F_d$ $\underline{|N_2\theta}$ is applied to the output thereof, and a divide by $N_2$ divider 28. The output of divider 28 is applied to utilization means (not shown) such as a phase measuring instrument, and as an input to phase detector 14 along lead 15. The output of phase detector 14 is an error signal $e_s$ applied to VCO 18 by way of filter 16 along lead 17. The voltage level of the error signal $e_s$ applied to lead 17 will vary in accordance with the phase difference between input signal $F_i/N_2$ $\underline{/\theta}$ and derived signal $F_d/N_2$ $\underline{/\theta}$. Low pass filter 16 serves to filter the ripples in the error signal $e_s$ and provides a second order loop in a conventional manner.

Figures 2, 3:
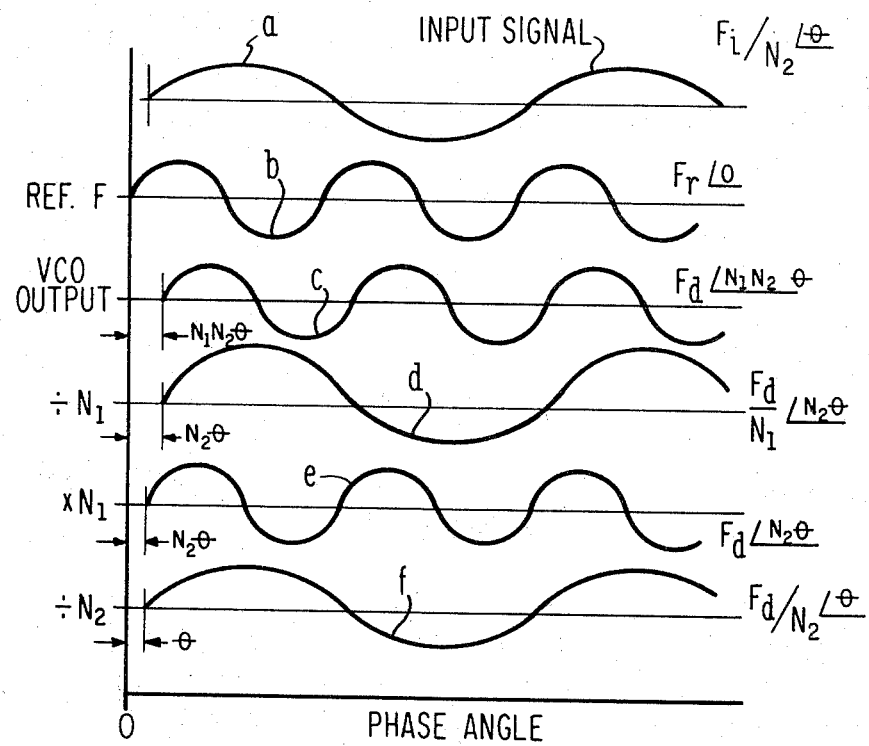

The output of VCO 18 on lead 13 is applied to divider 22 and is a signal whose frequency is $F_d$ $\underline{|N_1N_2\theta}$ as shown by curve c of FIG. 2. It is to be noted that the waveforms of FIG. 2 are exemplary for purposes of illustration. Divide by $N_1$ divider 22 serves to divide both the phase and the frequency of the input signal by $N_1$. Divider 22 is a programmable divider whose divisor is set in accordance with a programming signal applied along lead 19 to divide the input signal by a given divisor manifested by the designation $N_1$ and wherein each of the divisors $N_1$ is predetermined as will be explained. The output of divider 22 is a signal $F_d/N_1$ $\underline{|N_2\theta}$ whose frequency is $f_d/N_1$ as shown by waveform d of FIG. 2. It should be noted that only the fundamental components of the signals are shown in FIG. 2 for clarity. In an actual implementation digital logic levels would be maintained. Thus both frequency and phase are divided by divider 22. This divided signal, waveform d, is applied as an input to up mixer 24.

Up mixer 24 has an input signal applied on lead 21, which, when added to the output signal of divider 22, will multiply the frequency of the output signal of divider 22 by $N_1$ while maintaining the phase $N_2\theta$ of the divider output signal without change. As a result, up mixer 24 multiplies only frequency as can be seen in FIG. 2, waveform e. If the phase angle $N_2\theta$ is not changed, there is an actual shift of the waveform e with respect to the zero reference phase angle. This occurs since its frequency has been multiplied and the nature of an up mixer is such that there is no change in phase angle produced by such a device. The output of up mixer 24 thus is a signal $F_d$ $\underline{|N_2\theta}$ having a frequency $f_d$ $\underline{|N_2\theta}$. This signal $F_d$ $\underline{|N_2\theta}$ is applied as an input to a conventional filtering phase lock loop 26. The output of phase lock loop 26 is signal $F_d$ $\underline{|N_2\theta}$. Waveform e of FIG. 2, the output of phase lock loop 26, is applied as an input of $N_2$ divider 28. Divider 28 divides $F_d$ $\underline{|N_2\theta}$ producing $F_d/N_2$ $\underline{/\theta}$ which is applied to phase detector 14 and to the external utilization means.

However, as provided in accordance with the present invention, the divisors of dividers 22 and 28 are selected such that their products are always the same for a given input signal $F_i/N_2$ $\underline{/\theta}$. To accomplish this, an input programming signal is applied along lead 23 to divider 28 to so select the divisor of divider 28 such that its product with the divisor of divider 22 is constant regardless of the selected value of $N_2$ at any given instant.

Referring to FIG. 2, waveform f, there is shown the output of divider 28 whose frequency is $f_d/N_2$ $\underline{/\theta}$. Thus it is seen that while double division has taken place in loop 12 by dividers 22 and 28 and while M different divisions may be performed by deriving means 20 to produce a signal having M different frequencies, as long as the product of divisors of dividers 22 and 28 is the same and constant for a given input signal, then the phase angle $\theta$ of the derived signal at the output of divider 28 will always be the same. This is in contradistinction to conventional phase lock loops in which multiple different divisions cause a corresponding multiple different phase shifts in the divided signal phase angle. This necessarily causes phase jitter among the different divided signals and causes excessively wide bandwidths for the purposes of the present apparatus described above.

The transfer function for phase detector 14 is designated $K_D$ volts per radian while the transfer function for VCO 18 is $K_o$ radians per sec per volt. Additionally, the pertinent phase transfer functions for up mixer 24 and dividers 22, 28 and phase lock loop 26 are respectively given by 1, $1/N_1$, $1/N_2$. The transfer function for phase lock loop 26 is one. It can be shown that the transfer function for this loop in terms of the complex variables $s$ is as follows:

$$H(s) = K_oK_DG(s)/N_1N_2s + K_oK_DG(s)$$

where $G(s)$ is the transfer function of the low pass filter. When $G(s)$ is a single pole filter with a damping factor of 0.7, then the loop bandwidth can be shown to be as follows:

$$B_L = 0.53 \ \sqrt{K_oK_D/N_1 \ N_2\tau_1}$$

where $\tau_1$ is the filter time constant. Thus it will be appreciated that as long as $N_1 \ N_2$ is maintained constant, then the loop bandwidth $B_L$ will remain constant.

By maintaining the bandwidth $B_L$ constant the mean square phase jitter is also maintained constant as can be shown by the following relationship:

$\overline{\theta^2}_n = W_i \ B_L \ /P_s = 1/2(S/N)$ loop where $\overline{\theta^2}_n$ is the mean square phase jitter, $W_i$ is the input noise spectral density and $P_s$ is input signal power level.

To further illustrate the principles of operation of loop 12, by way of a simple example using numerical values, reference is made to FIG. 3 which illustrates the various exemplary values of frequency and phase for waveforms c, d, e and f of FIG. 2. Assume that the input signal $F_i/N_2\underline{|\theta}$, waveform a, has a phase error of 9° as indicated in the table of FIG. 3 wherein designations a through f relate to the respective waveforms a through f of FIG. 2. The values of $N_1$ and $N_2$ are arbitrarily selected at convenient low values to merely illustrate the principles of the present invention. The product of $N_1$ and $N_2$ is taken as 6. As seen, there are four combinations of values for $N_1$ and $N_2$ which yield this product. It is to be understood that in practice, not all combinations of the values of $N_1$ and $N_2$ which yield the same product need be utilized, but only those number of combinations which will yield the desired loop frequency $f_d/N_2$.

As seen in the table of FIG. 3, column 1 represents the phase and frequency of the derived signal when the divisor of divider 22 is 1 and the divisor of divider 28 is 6. In columns 2, 3 and 4, the phase angle and corresponding frequency of the derived signal is shown for various other combinations of divisors for dividers 22 and 28 as shown. In column 1 the divisor of divider 22 and 1 and the divisor of divider 28 is 6. This combination is utilized for an input signal whose frequency is arbitrarily placed at 200 Hertz. The output of the VCO, waveform c has a frequency $f_d$ which is $N_2 \times F_i$ or 1,200 Hertz, the phase angle is then $N_1 \times N_2 \times \theta$ or 54°. This signal is applied to divider 22. Divider 22 is set by a programming signal applied to lead 19 so as to set divider 22 to divide by 1. Division of waveform c by 1 results in waveform d whose phase and frequency is the same as that of waveform c. This divided waveform is applied to up mixer 24. An input signal is applied along lead 21 in a manner to be explained having components which, when mixed with waveform d, will result in waveform d being multiplied in frequency by $N_1$ with no change in phase angle. Thus, as seen in column 1, waveform e has a phase angle of 54° and a frequency of 1,200 Hertz. The output of up mixer 24 is applied to phase lock loop 26 which causes no change in frequency or phase angle and serving merely to filter the input signal. The output of the phase lock loop thus is the same as waveform e. Waveform e is applied as an input to divider 28. Divider 28 has been set to divide by 6 by a programming signal applied at an input along lead 23 in a manner to be explained. Note that the product of $N_1$ and $N_2$ is six. Note that this product remains constant in each of columns 1 through 4. When waveform e is divided by $N_2$ or 6, the division derives a signal having a phase angle of 9° and a frequency of 200 Hertz. Note that waveform f has a phase angle and frequency which agrees with the input signal waveform a.

In column 2, it is assumed that the input signal waveform a has a frequency of 400 Hertz and has the same phase error 9°. The output on the VCO again has the same phase angle and frequency as indicated on column 1 and is the same regardless of the input signal frequency as shown by the table of FIG. 3. At this time divider 22 is set by the programming signal to divide by 2, resulting in a phase angle of 27° and a frequency of 600 Hertz. The up mixer multiplies the frequency up to 1,200 Hertz while keeping the phase angle the same at 27°. Further division by divider 28 which has been set by a programming signal to divide by 3 divides the frequency of waveform e by 3 yielding a frequency of 400 Hertz and divides the phase by 3 yielding a phase angle of 9°. Note that the phase angle of the derived signal and its frequency is the same as that of the input signal.

This process is continued for each of the values of $N_1$ and $N_2$ whose products are the same, that is, 6 in this example. Note the problem that would occur should a single divisor be used as in conventional phase locked loops. Running across the row indicated by waveform d of FIG. 3, note that in each of the columns using a single divider, divider 22, for example, the corresponding input frequencies of 200, 400, 600, and 1,200 Hertz have respective different derived phase angles of 9°, 18°, 27° and 54°. This variation of phase angle causes the phase jitter and increased bandwith which prevents conventional phase locked loops from being utilized in the ranging application described previously. Note that all derived waveforms $F_d/N_2 \; \lfloor \theta$ have the same phase angle of 9° and corresponding frequency of the input signal then being tracked. It is to be understood that to maintain coherency while the phase tracking loop of the present invention is being switched by the programming signals for the different values of $N_1$ and $N_2$, the different frequency input signals are sequential in form so as to maintain the loop in a phase locked condition. The output of divider 28 then is applied as an input to phase detector 14 which generates the error signal $e_s$ in accordance with the phase difference between the derived output signal at lead 15 and input signal applied as a second input to the phase detector 14. This error signal is then applied in a conventional manner to VCO 18 through low pass filter 16 to shift the phase of VCO 18 until the error signal is nulled. In this condition, the output signal of divider 28 is substantially the same in frequency and phase as input signal $F_d/N_2 \; \lfloor \theta$ and is applied to utilization means (not shown) used to measure the phase difference between the derived signal and a reference signal having a zero phase.

Having described the phase track loop 12, constructed in accordance with the present invention, there will now be described the accompanying apparatus which provides the appropriate signal on lead 21 by which up mixer 24 generates the multiplication by $N_1$. In addition, the apparatus for programming dividers 22 and 28 will be described in addition to a phase and memory loop 30 which serves to lock VCO 18 in phase with a reference signal $F_r$ having a zero phase angle in the absence of an applied input signal, waveform a, at phase detector 14. In this manner the output of VCO 18 will be in phase with the reference signal and phase tracking loop 12 will be ready to track the input signal waveform a.

Reference clock 32 supplies a reference signal at 0° phase angle. The frequency of the reference clock signal is $N_2$ times the frequency of the input signal, waveform a. Signal $F_r$ is applied as input to phase detector 34 which is a part of phase memory loop 30 and applies an input signal to divide by $N_1$ divider 36 and down mixer 38. Divider 36 is synchronously tied to divider 22 via lead 19 so the divisors therefor switched in synchronism upon a receipt of a program control signal along lead 19. Mixer 38 is a suitable device which down mixes the divided output of divider 36 with the reference signal from clock 32. The output of down mixer 38 is applied along lead 21 and has a component $F_r(1-1/N_1)$. This component, when added to the output of divider 22 by up mixer 24, multiplies the output of divider 22 so as to provide at the output of mixer 24 a signal having a frequency at $f_d$ and a phase angle of $N_2\theta$. In effect, mixer 38, in combination with clock 32 and divider 36, serves as a frequency synthesizer which synthesizes that component which, when heterodyned with the output of divider 22, will yield a signal having the desired frequency. Note that mixer 38 serves to change frequency with no change in phase in the output signal thereof and serves to maintain the phase of the difference signal.

Phase memory loop 30 comprises phase detector 34, VCO 18 and low pass filter 16. The output of phase detector 34 is applied along lead 39 to one terminal 40 of a switch 42. The other terminal 44 is coupled along lead 17 to the output of phase detector 14. The common terminal 46 of switch 42 is connected to the input of low pass filter 16 and to one of terminals 40 or 44 in accordance with the switch position of switch 42. When connected to terminal 44, switch 42 closes phase tracking loop 12 and enables loop 12 to track the input signal applied to phase detector 14. In the other switch position, as controlled by a program signal on lead 47, switch 42 closes phase memory loop 30, which in this position forms a conventional phase locked loop.

The memory loop 30 will lock the VCO 18 output to the nearest period of reference 32 at the time of the switchover of switch 42 from lead 44 to lead 40. It should be noted that the phase error at the VCO 18 output can be as much as one period of reference 32. However, the actual error on lead 15, to the utilization means in terms of the input signal phase is one period divided by $N_1 N_2$ which is constant. Thus if it is desired to remember the nulled phase of the input signal to within 1 per cent, then $N_1 N_2 = 100$. Low pass filter 16 is of the Miller integrator type whose input voltage requirement is zero for constant output voltage. Since a VCO has a certain amount of temperature drift of center frequency a non-zero input is required to maintain this center frequency. The Miller integrator low pass filter serves this purpose of remembering the center frequency drift while allowing the phase detector output to go to zero thereby reducing static phase error. Thus a transient is not generated when switch 46 is activated and cycles are not skipped while memory loop 30 acquires the nearest period of reference 32.

An alternate mechanization of memory loop 30 to achieve even greater accuracy is to frequency multiply the output of VCO 18 and refrrence 32 prior to application as an input to phase detector 34. Memory loop 30 will thus lock to the nearest period of reference 32 divided by P where P is the order of frequency multiplication.

Program control 48 is a suitable device coupled to clock 32 so as to selectively switch switch 42 and dividers 22, 28 and 36, so that the divisors thereof will cuase loop 12 to derive signal $F_d/N_2$ $\underline{/\theta}$ which will correspond in frequency and phase to waveform a then being applied as an input to phase detector 14. The outputs of program control 48 are applied to lead 47, lead 19 and lead 23. The signals applied to lead 19 and lead 23 are generated apriori in synchronism with the applied input signal to simultaneously switch the divisors of dividers 22, 28 and 36. When switched the combination of the divisors is such that the divisor $N_2$ permits phase track loop 12 to derive a signal whose frequency corresonds to the frequency of the input signal then being tracked at phase detector 14. The program control signals are generated on leads 19 and 23 by program control 48 in accordance with a predetermined suitable program programmed into control 48. Switch 42 is switched by program control 48 whenever program control 48 knows in advance when a signal of waveform a will not be applied to phase detector 14 such as when input signal $F_i/N_2$ $\underline{/\theta}$ is a burst of sequential range tones emitted by a satellite. The circuitry of a suitable program control 48 is conventional and no further description there of will be described herein.

It will now be seen that a phase tracking loop is provided in accordance with the present invention which tracks a periodic input signal whose repetition rate may be any one of a plurality of predetermind values. The loop includes a plurality of phase and frequency dividers and at least one frequency multiplier. At least one of the divisors equals the multiplication factor of the multiplier.

A second embodiment is illustrated in FIG. 4. In FIG. 4, like numerals relate to like parts of FIG. 1. In the arrangement of FIG. 4, the output of divide by $N_1$ divider 22 is applid as an input to divider 28. The output of divider 28 is applied as an input to up mixer 60. This mixes the divider 28 output with the input signal on lead 62 to provide an output signal which is the derived signal $F_d/N_2$ $\underline{/\theta}$ on lead 64. The divisors of dividers 22 and 28 again have a product which is the same and constant for a given input signal $F_i/N_2$ $\underline{/\theta}$ applied to phase detector 14. Up mixer 60 in this case multiplies the output frequency of divider 28 by $N_1$ with no change in phase angle. This multiplcation is accomplished by synthesizing a signal on lead 62 which, when added to the output signal of divider 28, will yield a signal whose frequency is $f_d/N_2$ $\underline{/\theta}$.

To synthesize the components of the signal on lead 62, clock 32 is connected to divide by $N_2$ divider 64. Divider 64 also has an input from program control 48 which serves to select the value of the divisor of divider 64 as described previously in connection with the apparatus of FIG. 1, divider 64 being substantially the same as divider 28. The output of divider 64 is applied as an input to down mixer 66 and as an input to divide by $N_1$ divider 36 which is substantially the same as divider 22. The output of divide by $N_1$ divider 36 is applied as an input to down mixer 66. Down mixer 66 generates a signal having a component $F_r(1/N_2 - 1/N_1N_2)$ $\underline{/\theta}$. The signal on line 62 is then added to up mixer 60 to multiply the output of divider $N_2$ by $N_1$ without altering the phase. Program control 48 simultaneously switches the divisors of dividers 22, 28, 36 and 64, the divisors of dividers 22 and 36 being the same and the divisors of dividers 28 and 64 being the same.

The transfer function of the phase tracking loop of phase detector 14, filter 16, VCO 18, dividers 22 and 28 and up mixer 60 remains constant, regardless of the frequency of the derived signal on lead 64. The transfer function analysis described above with respect to FIG. 1 applies equally well to the arrangement of FIG. 4.

It will occur to those skilled in the art that other arrangements and combinations of the dividers and mixers may be provided in accordance with the present invention to provide a phase track loop of constant bandwidth and mean square phase jitter for tracking a signal having a plurality of repetition rate.

What is claimed is:

1. In a system for tracking the phase of a periodic input signal whose repetition rate may be any one of a plurality of predetermined values, a phase tracking loop therefor having a given bandwidth which is substantially invariant for all of said values, comprising:
   a voltage controlled oscillator for generating an output signal having a given frequency which is harmonically related to each and every one of said values, a phase detector for producing an error signal manifesting the difference in phase between a first signal input thereto and a second signal input thereto, input means for applying said periodic input signal as said first signal input to said phase detector and said error signal as an input to said voltage controlled oscillator, and programmed signal deriving means coupled between said voltage controlled oscillator and said phase detector for deriving said second signal input to said phase detector from the output of said voltage controlled oscillator, said signal deriving means including a plurality of integral dividers and at least one multiplier for altering the phase of the voltage controlled oscillator output solely by dividing said output phase by the product of all the divisors of said dividers while altering the frequency of the voltage controlled oscillator output by both dividing the frequency by the product of said divisors and multlying said frequency by an integer equal to at least one of said divisors such that the frequency and phase of said derived signal is substantially the same as said periodic signal then being applied to said phase tracking loop.

2. The phase tracking loop of claim 1 wherein said dividers and multiplier are serially connected between said voltage controlled oscillator and said phase detector.

3. The phase tracking loop of claim 1 wherein said multiplier is coupled intermediate said dividers, a first divider being coupled between said voltage controlled oscillator and said multiplier, said integer being substantially equal to the divisor of said first divider.

4. The phase tracking loop of claim 1 wherein said dividers include first and second dividers serially coupled to said voltage controlled oscillator, said multiplier being serially coupled between said dividers and said phase detector, said integer being substantially equal to the product of said divisors.

5. The phase track loop of claim 1 wherein said multiplying means includes first mixing means for mixing the voltage controlled output divided by said one divisor as a first mixing input signal with a second mixing input signal to prodice a multiplied output signal, and input means for applying said first and second mixing input signals to said mixing means.

6. The phase track loop of claim 5 wherein said multiplied output signal is the sum of said first and second mixing input signals.

7. The phase track loop of claim 5 further including means for deriving said first mixing second input signal from an applied reference signal having a given frequency and phase, said last-mentioned deriving means including at least one dividing means having a divisor substantially equal to said one divisor.

8. The phase track loop of claim 7 wherein said last-mentioned deriving means includes second mixing means for mixing a third signal input thereto with a fourth signal input thereto for producing said second mixing input signal, and means for applying said reference signal as said third signal input and the output of said last-mentioned dividing means as said fourth signal input.

9. In a system for tracking the phase of a periodic input signal whose repetition rate may be any one of a plurality of predetermined values, a phase tracking loop therefor having a given bandwidth which is substantially invariant for all of said values, comprising:

a voltage controlled oscillator for generating an output signal having a given frequency which is harmonically related to each and every one of said values, a first phase detector for producing an error signal manifesting the difference in phase between a first signal input thereto and a second signal input thereto, input means for applying said periodic input signal as said first signal input to said phase detector and said error signal as an input to said voltage controlled oscillator, programmed signal deriving means coupled between said voltage controlled oscillator and said phase detector for deriving said second signal input to said phase detector from the output of said voltage controlled oscillator, said signal deriving means including a plurality of programmed integral dividers and at least one programmed multiplier for altering the phase of the voltage controlled oscillator output solely by dividing said output phase by the product of all the divisors of said dividers while altering the frequency of the voltage controlled oscillator output by both dividing the frequency by the product of said divisors and multiplying said frequency by an integer equal to at least one of said divisors, said dividers and multipliers being responsive to respective programming signals applied thereto, and programming means for generating said programming signals to program each of said divisors and the multiplication factor of said multiplier in accordance with the repetition rate value of the periodic input signal then being tracked such that the frequency of said derived signal is substantially the same as that of the periodic signal then being applied to said phase tracking loop.

10. The phase tracking loop of claim 9 further including a second phase detector for producing an error signal manifesting the difference in phase between a third signal input thereto and a fourth signal input thereto, input means for applying said voltage controlled output as said third signal input to said second phase detector and a reference signal having a given frequency and phase as said fourth input to said second phase detector, and switching means selectively applying one of the errir signals generated by either said first or second phase detectors as an input to said voltage controlled oscillator in response to a program signal applied thereto by said programming means.

* * * * *